(12) United States Patent
Yamada et al.

(10) Patent No.: US 9,010,107 B2
(45) Date of Patent: Apr. 21, 2015

(54) ELECTRIC BOOSTER

(75) Inventors: Yukihiko Yamada, Minami-ALPS (JP);
Kentaro Ueno, Minami-ALPS (JP);
Yusuke Nozawa, Minami-ALPS (JP);
Daisuke Kojima, Minami-ALPS (JP);
Tohma Yamaguchi, Minami-ALPS (JP)

(73) Assignee: Hitachi Automotive Systems, Ltd.,
Ibaraki (JP)

( * ) Notice: Subject to any disclaimer, the term of this patent is extended or adjusted under 35 U.S.C. 154(b) by 853 days.

(21) Appl. No.: 13/240,197

(22) Filed: Sep. 22, 2011

(65) Prior Publication Data
US 2012/0102941 A1 May 3, 2012

(30) Foreign Application Priority Data

Oct. 29, 2010 (JP) ................................. 2010-244769

(51) Int. Cl.
*B60T 13/74* (2006.01)
*B60T 8/48* (2006.01)
(52) U.S. Cl.
CPC ............. *B60T 13/745* (2013.01); *B60T 8/4845* (2013.01)
(58) Field of Classification Search
CPC .................................................... B60T 13/745
USPC ........................................ 60/534, 545; 303/3
See application file for complete search history.

(56) References Cited

U.S. PATENT DOCUMENTS

| 7,367,187 B2 | 5/2008 | Ikeda et al. |
| 2009/0115242 A1 | 5/2009 | Ohtani et al. |
| 2009/0236903 A1* | 9/2009 | Nishino et al. ..................... 303/3 |

FOREIGN PATENT DOCUMENTS

| JP | 2007-112426 | 5/2007 |
| JP | 2007-161150 | 6/2007 |
| JP | 2007-191133 | 8/2007 |

OTHER PUBLICATIONS

Office Action mailed Jul. 30, 2014 in corresponding Japanese patent application No. 2010-244769 (with English translation).

* cited by examiner

*Primary Examiner* — F. Daniel Lopez
(74) *Attorney, Agent, or Firm* — Wenderoth, Lind & Ponack, L.L.P.

(57) ABSTRACT

An electric motor is controlled based on an operation of a brake pedal to move a primary piston forward through a ball screw mechanism, thereby generating a hydraulic pressure in a master cylinder. At this time, a reaction force from the hydraulic pressure in the master cylinder is fed back to the brake pedal through an input piston. Automatic brake control, which generates the hydraulic pressure by driving the electric motor regardless of whether there is the operation of the brake pedal, is carried out. During the automatic brake control, an actual relative position is compared with a determination threshold value set based on the relative position between the primary piston and the input piston which is generated by a movement of the primary piston, and it is determined that the brake pedal is operated in a case where the relative position is smaller than the determination threshold value.

12 Claims, 4 Drawing Sheets

ELECTRIC BOOSTER

BACKGROUND OF THE INVENTION

The present invention relates to a booster installed to a brake apparatus of a vehicle such as an automobile, and in particular, to an electric booster using an electric actuator as a boosting source.

As disclosed in, for example, Japanese Patent Public Disclosure Nos 2007-191133 and 2007-112426, there is known an electric booster including an input piston connected to a brake pedal, and an assist piston to be driven by an electric actuator (electric motor) which are inserted in a master cylinder, and configured to move the assist piston forward by controlling an operation of the electric motor by a controller based on a relative position between these pistons, thereby generating a desired hydraulic pressure in the master cylinder. This electric booster includes a neutral spring for biasing the relative position between the input piston and the assist piston to a predetermined neutral position, and thereby can carry out various kinds of brake control such as the boosting control, the brake assist control, and the regenerative cooperative control without causing an uncomfortable feeling against a pedal operation by adjusting a reaction force to the brake pedal with the aid of the spring force of the neutral spring which is generated according to the relative position between the input piston and the assist piston. Further, this electric booster can carry out the automatic brake control by moving the assist piston forward by causing the controller to drive the electric motor according to, for example, a running condition of the vehicle without relying on a brake pedal operation.

For example, in the vehicle follower control, which functions to maintain a predetermined distance to a preceding vehicle, a driver's pressing of the brake pedal during execution of the automatic brake control triggers a stop of the automatic brake control, and switches the brake control to such control that the driver's brake operation is prioritized (override is caused by a brake operation). In this case, the conventional techniques achieve a stop of the automatic brake control by monitoring a displacement of the brake pedal, and determining that a driver operates the brake pedal when the brake pedal is displaced.

However, as the advancing amount of the assist piston is increased during the execution of the automatic brake control, this may cause the input piston to be pulled in toward the master cylinder by the assist piston through the neutral spring, resulting in a displacement of the brake pedal. Therefore, only by monitoring a displacement of the brake pedal, it is difficult to accurately detect whether the brake pedal is displaced because the brake pedal is pulled in along with an advance of the assist piston during the automatic brake control, or because a driver operates the brake pedal.

SUMMARY OF THE INVENTION

An object of the present invention is to provide an electric booster capable of detecting a driver's operation of a brake pedal during the automatic brake control.

To achieve the forgoing and other objects, an aspect of the present invention is an electric booster including an input member adapted to be moved forward or backward in response to an operation of a brake pedal, an assist member disposed so as to be movable relative to the input member, a master cylinder adapted to generate a brake hydraulic pressure according to a forward or backward movement of the assist member, an electric actuator adapted to provide a thrust force to the assist member, a controller adapted to control an operation of the actuator, and a biasing unit adapted to bias the input member and the assist member so that a relative position therebetween is moved toward a predetermined neutral position. The controller can perform automatic brake control of driving the electric actuator regardless of whether there is the operation of the brake pedal. During the automatic brake control, the controller compares the relative position between the input member and the assist member with a determination threshold value set based on the relative position between the input member and the assist member which is generated according to a movement of the assist member, and determines that the brake pedal is operated in a case where the relative position is smaller than the determination threshold value and the input member is moved by a predetermined amount or more.

Another aspect of the present invention is an automatic brake control method by an electric booster. The electric booster includes an input member adapted to be moved forward or backward in response to an operation of a brake pedal, an assist member disposed so as to be movable relative to the input member, a master cylinder adapted to generate a brake hydraulic pressure according to a forward or backward movement of the assist member, an electric actuator adapted to provide a thrust force to the assist member, and a biasing unit adapted to bias the input member and the assist member so that a relative position therebetween is moved toward a predetermined neutral position. The electric booster can perform automatic brake control of driving the electric actuator regardless of whether there is the operation of the brake pedal. The automatic brake control method includes setting a determination threshold value based on the relative position between the input member and the assist member which is generated according to a movement of the assist member during the automatic brake control, comparing the determination threshold value with the relative position between the input member and the assist member, and determining that the brake pedal is operated, in a case where the relative position is smaller than the determination threshold value and the input member is moved by a predetermined amount or more.

Still another aspect of the present invention is an electric booster including an input member adapted to be moved forward or backward in response to an operation of a brake pedal, an assist member disposed so as to be movable relative to the input member, a master cylinder adapted to generate a brake hydraulic pressure according to a forward or backward movement of the assist member, an electric actuator adapted to provide a thrust force to the assist member, a controller adapted to control an operation of the actuator, a biasing unit adapted to bias the input member and the assist member so that a relative position therebetween is moved toward a predetermined neutral position, a stroke detector adapted to detect a movement displacement of the input member, and a hydraulic pressure detector adapted to detect the brake hydraulic pressure generated in the master cylinder. The controller includes an automatic brake controller adapted to drive the electric actuator regardless of whether there is the operation of the brake pedal, a determination threshold value storage unit adapted to store a determination threshold value set based on the relative position between the input member and the assist member which is generated by a movement of the assist member during the automatic brake control, a comparison unit adapted to compare the relative position between the input member and the assist member with the determination threshold value, and a determination unit adapted to determine that the brake pedal is operated in a case where the relative position is smaller than the determination threshold value and the input member is moved by a predetermined amount or more while the automatic brake controller is carrying out the automatic brake control.

DETAILED DESCRIPTION OF THE INVENTION

Hereinafter, an embodiment of the present invention will be described in detail with reference to the accompanying drawings.

Figure 1:
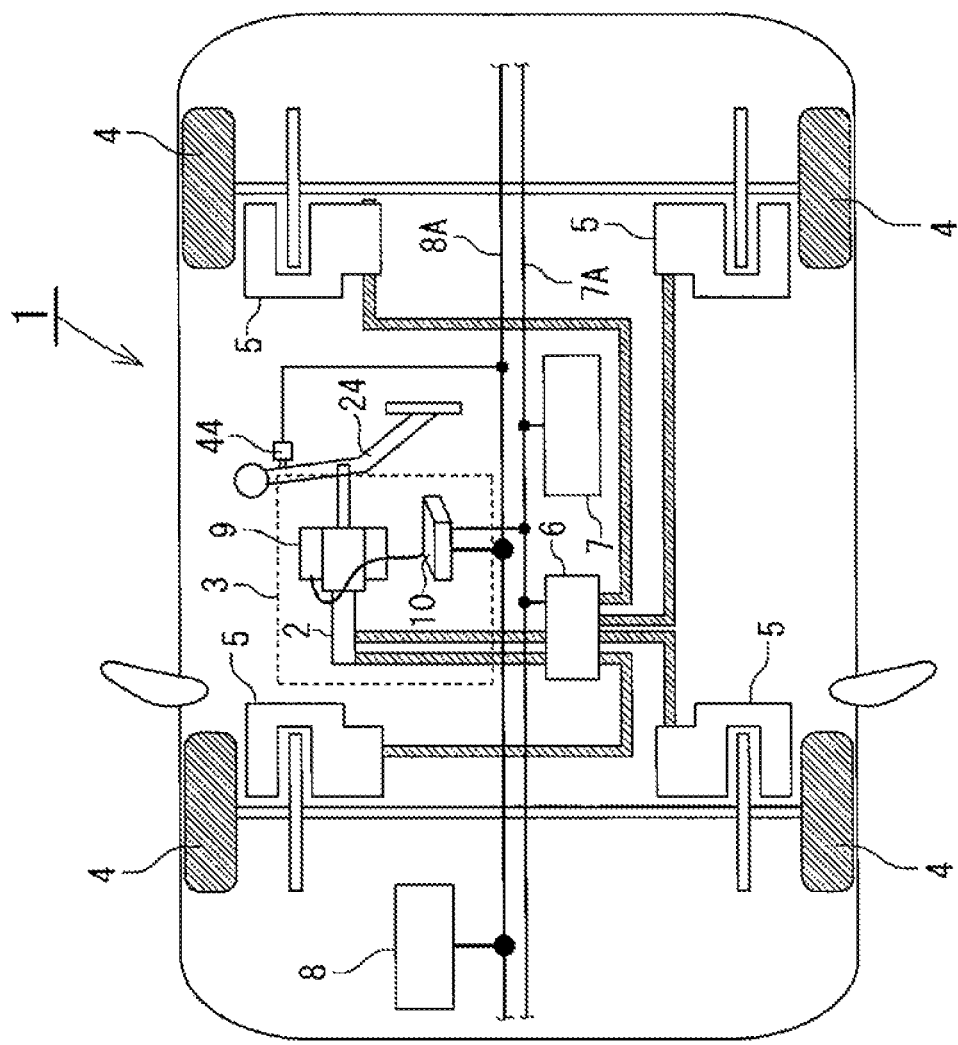
FIG. 1 schematically illustrates a configuration of a brake system of a vehicle to which an electric booster according to an embodiment of the present invention is installed.

FIG. 1 illustrates a brake system of a vehicle to which an electric booster according to an embodiment of the present invention is installed.

As illustrated in FIG. 1, a brake system 1 includes an electric booster 3, hydraulic brakes 5, a hydraulic controller 6, an in-vehicle controller 7, and a power source apparatus 8. The electric booster 3 generates a hydraulic pressure by a master cylinder 2. The hydraulic brakes 5 are connected to the master cylinder 2, and function to apply brake forces to wheels 4 according to supplies of hydraulic pressures. The hydraulic controller 6 is disposed between the hydraulic brakes 5 and the master cylinder 2. The in-vehicle controller 7 is mutually connected to in-vehicle apparatuses including the hydraulic controller 6 through an in-vehicle communication system 7A. The power source apparatus 8 supplies power to in-vehicle electric apparatuses including the electric booster 3, the hydraulic controller 6, and the in-vehicle controller 7 through an in-vehicle power system 8A. The electric booster 3 includes an electric boosting mechanism 9 attached to the master cylinder 2, and a controller 10 for controlling an operation of the electric boosting mechanism 9.

Figure 2:
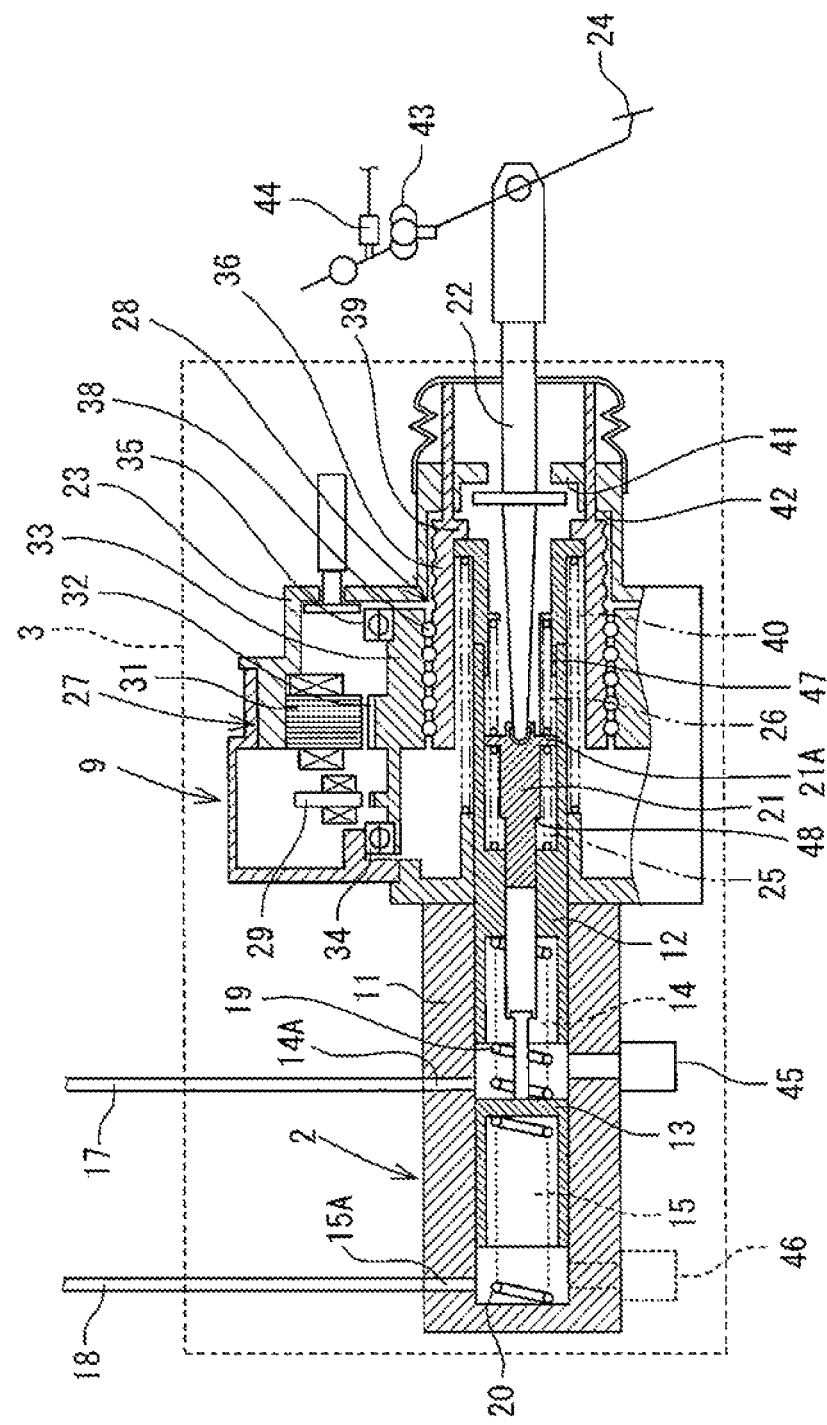
FIG. 2 is a vertical cross-sectional view schematically illustrating a configuration of the electric booster according to the embodiment of the present invention.

The electric booster 3 will be described with reference to, mainly, FIG. 2. As illustrated in FIG. 2, the master cylinder 2 is a tandem-type master cylinder. A primary piston 12 (assist member) is inserted in a cylinder 11 filled with brake hydraulic fluid, and is disposed at the opening side of the cylinder 11. A secondary piston 13 is inserted in the cylinder 11, and is disposed at the bottom side of the cylinder 11. A primary chamber 14 is defined between the primary piston 12 and the secondary piston 13 as a pressure chamber. A secondary chamber 15 is defined between the secondary piston 13 and the bottom of the cylinder 11 as a pressure chamber. Then, a forward movement of the primary piston 12 causes pressurization of the brake hydraulic fluid in the primary chamber 14, and thereby causes a forward movement of the secondary piston 13, leading to pressurization of the brake hydraulic fluid in the secondary chamber 15. As a result, the brake hydraulic fluid is supplied from a primary port 14A and a secondary port 15A to wheel cylinders of the hydraulic brakes 5 via the hydraulic controller 6 while being transmitted through two pipe systems 17 and 18. A reservoir (not shown) reserving brake hydraulic fluid is connected to the primary chamber 14 and the secondary chamber 15. This reservoir is in communication with the primary chamber 14 and the secondary chamber 15 when the primary piston 12 and the secondary piston 13 are located at their respective original positions, and appropriately supplies the brake hydraulic fluid to the master cylinder 2. The primary piston 12 and the secondary piston 13 are biased to their original positions by return springs 19 and 20.

In this way, the brake hydraulic fluid is supplied from the primary port 14A and the secondary port 15A into two hydraulic circuits, which are respectively constituted by the pipes 17 and 18, by the two pistons, the primary piston 12 and the secondary piston 13. Due to this configuration, even if a failure occurs in one of the hydraulic circuits, a supply of the hydraulic pressure can be achieved by the other of the hydraulic circuits, maintaining the brake function.

An input piston 21, which is an input member, is slidably and liquid-tightly inserted through the center of the primary piston 12, and the tip of the input piston 21 is inserted in the primary chamber 14. In other words, the tip of the input piston 21 is located to face the primary chamber 14, which is a pressure chamber of the master cylinder. An input rod 22 is coupled to the rear end of the input piston 21. The input rod 22 extends to the outside through a housing 23 of the electric boosting mechanism 9. A brake pedal 24 is coupled to the end of the input rod 22. A pair of neutral springs 25 and 26 (compression coil springs), which is a biasing unit, is disposed between the primary piston 12 and the input piston 21. The neutral springs 25 and 26 are disposed at the opposite sides of a flange-like spring retainer 21A formed at the input piston 21. The neutral spring 25 biases the input piston 21 in a retracting direction. The neutral spring 26 biases the input piston 21 in an advancing direction. The neutral springs 25 and 26 serve to elastically maintain the input piston 21 at the neutral position relative to the primary piston 12, and apply the spring forces to the primary piston 12 and the input piston 21 to return them to the neutral positions with respect to their axial relative positions.

The electric boosting mechanism 9 includes an electric motor 27, a ball screw mechanism 28, and a rotational position sensor 29. The electric motor 27 functions as an electric actuator for driving the primary piston 12. The ball screw mechanism 28 functions as a rotation/linear motion conversion mechanism for converting a rotational motion of the electric motor 27 into a linear motion to move the primary piston 12 forward. The rotational position sensor 29 detects the rotation position of the electric motor 27. The electric motor 27, the ball screw mechanism 28, and the rotational position sensor 29 are contained in the housing 23 coupled to the master cylinder 2.

The electric motor 27 includes an annular stator 31 fixed to the inner circumference of the housing 23, and a hollow rotor 32 inserted in the stator 31, and is driven by receiving driving current from the controller 10. The rotor 32 is integrally provided with a rotational member 33 of the ball screw mechanism 28, which will be described later, and is rotatably supported to the housing 23 through bearings 34 and 35. The present embodiment employs, as the electric motor 27, a permanent magnet synchronous motor configured to be driven by three-phase alternating current due to its compact size and ability to easily provide a large torque. However, the electric motor 27 may be embodied by any other type of electric motor, such as an induction motor, an AC motor, a DC motor, and a DC brushless motor, which are known to the public.

The ball screw mechanism 28 includes a cylindrical linear motion member 36, the cylindrical rotational member 33, and balls (steel balls) 38. The rear end of the primary piston 12 and the input rod 22 are inserted in the linear motion member 36. The linear motion member 36 is inserted in the rotational member 33. The rotational member 33 is integrally provided with the rotor 32 of the electric motor 27. The balls 38 are a plurality of rolling bodies disposed between screw grooves formed between the linear motion member 36 and the rotational member 33. The electric motor 27 is driven to rotate the rotational member 33 integrally provided with the rotor 32, thereby causing rolling motions of the balls 38 in the screw grooves to generate a linear motion of the linear motion member 36. The linear motion member 36 includes a radially inwardly protruding abutment portion 39 in abutment with the rear end of the primary piston 12. The primary piston 12 is biased toward the retracted side together with the linear motion member 36 by a return spring 40 disposed between the front of the housing 23 and the primary piston 12. Therefore, the primary piston 12 can be separated from the abutment portion 39 of the linear motion member 36 to be moved forward alone.

Further, the ball screw mechanism 28 has backdrivability, and can rotate the rotational member 33 by a linear motion of the linear motion member 36. Therefore, even if the electric motor 27 is in an inoperative state due to, for example, disconnection, since the linear motion member 36 is returned to a retracted position together with the primary piston 12 by the spring force of the return spring 40, a brake drag can be prevented by releasing the hydraulic pressure in the master cylinder 2. At this time, since the primary piston 12 can be separated from the linear motion member 36 to be moved forward alone, the input piston 21 and the primary piston 12 can be operated by an operation of the brake pedal 24 through the input rod 22, thereby maintaining the brake function.

The rotation/linear motion conversion mechanism may be embodied by another mechanism capable of converting a rotational motion of the electric motor 27 into a linear motion to move the primary piston 12 forward, such as a rack and pinion mechanism, although the present embodiment employs the ball screw mechanism 28 in consideration of, for example, an amount of a play, efficiency, and durability. Further, in the present embodiment, the rotor 32 is integrally provided with the rotational member 33, and the ball screw mechanism 28 is directly driven by the electric motor 27. However, a known transmission mechanism or speed reduction mechanism using, for example, a belt and a gear may be disposed between the rotor 32 and the rotational member 33.

Stoppers 41 and 42 are provided at the rear portion of the housing 23 for limiting the respective retracted positions of the input rod 22 and the linear motion member 36. When the electric boosting mechanism 9 is not operated, the primary piston 12 is biased to the retracted position by the spring force of the return spring 40. At this time, the rear end of the primary piston 12 pushes the abutment portion 39 of the linear motion member 36, and therefore the linear motion member 36 is also biased toward the retracted position together with the primary piston 12. Then, the linear motion member 36 abuts against the stopper 42. When the primary piston 12 is biased toward the retracted position by the spring force of the return spring 40, an intermediate wall of the primary piston 12 pushes a stepped portion 48 of the input piston 21, and therefore the input piston 21 is biased toward the retracted position together with the input rod 22. At this time, the input rod 22 abuts against the stopper 41. Then, the input piston 21 is offset from the neutral position by a predetermined distance, and is maintained in such a state that a predetermined set load is applied to the input piston 21 by the neutral springs 25 and 26.

The rotational position sensor 29 detects the rotational angle (phase) of the rotor 32 of the electric motor 27. Although the rotational position sensor 29 is embodied by a resolver in the present embodiment, it may be embodied by another type of sensor such as a rotary encoder. The electric booting mechanism 9 further includes a stroke sensor 43 for detecting a displacement of the input rod 22 relative to the housing 23. In the present embodiment, the stroke sensor 43 is attached to the brake pedal 24 coupled to the input rod 22. However, the stroke sensor 43 may be configured to directly detect a displacement of the input rod 22, and be embodied by, for example, a known potentiometer or encoder. Further, a brake switch 44 is disposed for detecting whether the brake pedal 24 is operated. The brake switch 44 may also function as a brake lamp switch of the vehicle. Hydraulic sensors 45 and 46, which respective detect the hydraulic pressures in the primary chamber 14 and the secondary chamber 15, are disposed in the master cylinder 2.

The controller 10 uses: detection signals from various kinds of sensors such as the rotational position sensor 29, the stroke sensor 43, the brake switch 44, and the hydraulic sensors 45 and 46; vehicle information received from, for example, various kinds of in-vehicle apparatuses including the in-vehicle controller 7 through the in-vehicle communication system 7A; and, for example, internally stored information. Based on these kinds of information, the controller 10 processes them according to predetermined logics and rules, outputs drive current, and thereby controls an operation of the electric motor 27. At this time, the controller 10 can obtain a displacement of the linear motion member 39 of the ball screw mechanism 28, i.e., a displacement of the primary piston 12 from the rotational position of the rotor 32 of the electric motor 27, which is detected by the rotational position sensor 29. Then, the controller 10 can calculate the relative position between the primary piston 12 and the input piston 21 from this displacement of the primary piston 12 and a displacement of the input rod 22 (i.e., the input piston 21), which is detected by the stroke sensor 43.

The hydraulic controller 6 includes, for example, a cut-off valve for disconnecting the hydraulic controller 6 from the master cylinder 2, a hydraulic pump, an accumulator, and a changeover valve. The hydraulic controller 6 can carry out various modes based on an instruction from, for example, the in-vehicle controller 7. Examples of modes include a normal brake mode of supplying a hydraulic pressure from the master cylinder 2 to the hydraulic brake apparatuses 5 of the respective wheels 4, a pressure reduction mode of reducing the hydraulic pressures in the hydraulic brake apparatuses 5, a maintaining mode of maintaining the hydraulic pressures in the hydraulic brake apparatuses 5, a pressure increase mode of recovering the reduced hydraulic pressures in the hydraulic brake apparatuses 5, and a pressurization mode of supplying hydraulic pressures to the hydraulic brake apparatuses 5 by operating the hydraulic pump regardless of the hydraulic pressure in the master cylinder 2.

Then, various kinds of brake control can be realized by appropriately carrying out the control of these operation modes according to a vehicle running state. Examples of executable brake control include the brake force distribution control of appropriately distributing brake forces to the respective wheels according to, for example, a vertical load during a brake operation, the anti-lock brake control of preventing a lock of each wheel by automatically adjusting a brake force applied to each wheel during a brake operation, the vehicle stability control of stabilizing the behavior of the vehicle by detecting a skid of a wheel while the vehicle is running to appropriately automatically provide a brake force to each wheel to prevent an understeer or oversteer state, the hill start aid control of assisting a start of the vehicle by maintaining a braked state on a sloping road (especially, upwardly sloping road), the traction control of preventing occurrence of a wheel spin, for example, when the vehicle starts to run, the vehicle follower control of maintaining a predetermined distance to a preceding vehicle, the lane departure preventing control of maintaining a vehicle within a driving lane, and the obstacle avoidance control of preventing a vehicle from colliding with an obstacle.

In the present embodiment, the hydraulic brake apparatuses 5 each are embodied by a hydraulic disk brake configured to supply a hydraulic pressure of the brake hydraulic fluid to the wheel cylinder to move a piston forward to push a brake pad to a disk rotor rotating together with the wheel, thereby generating a brake force. However, the hydraulic brake apparatuses 5 may be embodied by another type of hydraulic brake apparatus such as a drum brake.

Next, how the controller 10 of the electric booster 3 controls the electric motor 27 will be described. The primary piston 12 and the secondary piston 13 function in a substantially same manner, so that only the primary piston 10 will be described below.

The controller 10 actuates the electric motor 27 based on an operation amount of the brake pedal 24 (a displacement of the input rod 22) which is detected by the stroke sensor 43, and moves the primary piston 12 forward through the ball screw mechanism 28, thereby generating a hydraulic pressure in the master cylinder 2. In this way, the brake hydraulic pressure generated in the master cylinder 2 is supplied from the primary and secondary ports 14A and 15A into the hydraulic brake apparatuses 5 of the respective wheels via the pipe hydraulic controller 6 while being transmitted through the pipes 17 and 18, thereby generating a brake force. Further, when the operation of the brake pedal 24 is released, the input piston 21, the primary piston 12, and the secondary piston 13 are retracted so that the primary and secondary chambers 14 and 15 are depressurized, thereby releasing a brake operation.

When the brake is applied, the input piston 21 (having a smaller pressure-receiving area than that of the primary piston 12) receives the hydraulic pressure in the primary chamber 14, and feeds back the reaction force thereof to the brake pedal 24 through the input rod 22. As a result, a desired brake force can be generated at a predetermined boosting ratio according to the ratio of the pressure-receiving areas of the primary piston 12 and the input piston 21. Then, it is possible to obtain a brake pedal reaction force suited to brake control such as the boosting control, the brake assist control, and the regenerative cooperative control by appropriately adjusting the relative position between the input piston 21 and the primary piston 12 to apply the spring forces of the neutral springs 25 and 26 to the input piston 21 to increase or reduce the reaction force to be applied to the brake pedal 24.

For example, it is possible to obtain a predetermined boosting ratio determined based on the ratio of the pressure-receiving areas of the input piston 21 and the primary piston 12 by moving the primary piston 12 according to a displacement of the input piston 21, and controlling the relative position so that the relative displacement therebetween is eliminated.

Further, it is possible to change the boosting ratio by multiplying a displacement of the input piston 21 by a proportional gain to change the relative position between the input piston 21 and the primary piston 12. At this time, the boosting ratio is increased by moving the primary piston 12 forward relative to the neutral position, while the boosting ratio is reduced by moving the primary piston 12 backward relative to the neutral position.

Utilizing this control, the brake system 1 can provide so-called the brake assist control, i.e., detecting the necessity of an emergency brake operation based on, for example, an operation amount and an operation speed (the rate of a change in an operation amount) of the brake pedal 24, and immediately generating a required brake force (hydraulic pressure) by increasing the boosting ratio.

Further, the brake system 1 can provide the regenerative cooperative control of adjusting the boosting ratio so as to generate a hydraulic pressure reduced by an amount corresponding to regenerative braking based on information from a regenerative brake system, and achieving a desired brake force as a sum of a brake force derived from the regenerative braking and a brake force derived from the generated hydraulic pressure during a regenerative brake operation.

Further, the brake system 1 can provide the automatic brake control of driving the electric motor 27 regardless of whether there is an operation amount of the brake pedal 24 (a displacement amount of the input piston 21) to move the primary piston 12, and generating a brake force by controlling a hydraulic pressure to be generated in the master cylinder 2 based on detection of the hydraulic sensors 45 and 46. As a result, it is possible to carry out control of an operation of the vehicle, such as the above-mentioned vehicle follower control, lane departure prevention control, and obstacle avoidance control with use of the controller 10 by automatically adjusting a brake force based on a vehicle state detected by the various kinds of sensors and appropriately combining other vehicle control such as the engine control and the steering control.

Next, the automatic brake control for realizing, for example, the above-mentioned vehicle follower control will be described.

When the brake pedal 24 is not operated, the controller 10 issues an instruction to drive the electric motor 27 to move the primary piston 12 forward, and controls the operation of the electric motor 27 based on the hydraulic pressures in the primary chamber 14 and the secondary chamber 15 detected by the hydraulic sensors 45 and 46, thereby generating a desired hydraulic pressure to obtain a required brake force.

Figure 3:
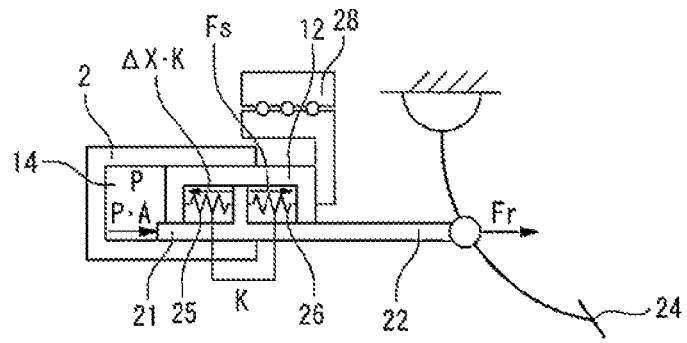
FIG. 3 illustrates the relationship among forces applied to an input piston of the electric booster illustrated in FIG. 2.

At this time, as illustrated in FIG. 3, the spring forces of the neutral springs 25 and 26, and the hydraulic pressure P in the primary chamber 14 are applied to the input piston 21. When the brake pedal 24 is not pressed, the input piston 21 is located at the initial position by receiving the spring force of the return spring 40 (refer to FIG. 2) while the set load Fs from the neutral springs 25 and 26 are applied to the input piston 21. When the automatic brake control is carried out in this state, the forward movement of the primary piston 12 causes the neutral spring 25, which is one of the neutral springs, to be extended, and the neutral spring 26, which is the other of the neutral springs, to be compressed. Further, the hydraulic pressure P in the primary chamber 14 is increased.

At this time, the reaction force Fr, which is a force applied to the input piston 21 in the retracting direction, is expressed by the following equation (1):

$$Fr = A \cdot P - \Delta X \cdot K + Fs \quad (1)$$

In this equation,

A: represents the pressure-receiving area of the input piston 21,

P: represents the hydraulic pressure in the master cylinder 2 (the primary chamber 14), ΔX: represents the relative position between the primary piston 12 and the input piston 21, K: represents the synthetic spring constant of the neutral springs 25 and 26, and Fs: represents the set load by the neutral springs 25 and 26 when the input piston 21 is located at the initial position.

Figure 4:
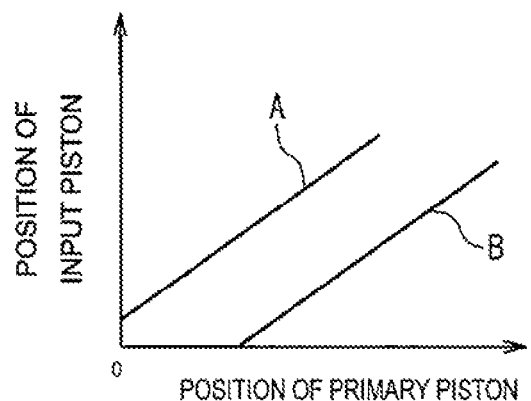
FIG. 4 is a graph illustrating the relationship between the position of the input piston and the position of a primary piston in the electric booster illustrated in FIG. 2.

During execution of the normal boosting control (at a fixed boosting ratio), which generates a brake force based on an operation of the brake pedal 24, the position of the input piston 21 and the position of the primary piston 12 are proportional to each other, and shows the relationship as indicated by the line segment A in FIG. 4.

On the other hand, during execution of the above-described automatic brake control, a forward movement of the primary piston 12 increases the hydraulic pressure P in the master cylinder 2 and the relative position ΔX. Once the reaction force Fr is reduced to below zero (Fr<0), the forward movement of the primary piston 12 starts to pull the input 21 (i.e., the brake pedal 24), and establishes the positional relationship between the input piston 21 and the primary piston 12 as indicated by the line segment B in FIG. 4.

The automatic brake control such as the vehicle follower control is released when a driver operates the brake pedal 24. After that, the controller 10 prioritizes the driver's operation of the brake pedal 24 (override), and starts the normal boosting control based on the operation amount of the brake pedal 24. This switching of the control can be achieved by monitoring a driver's operation of the brake pedal 24, stopping the automatic brake control when the driver operates the brake pedal 24, and starting the control based on the driver's operation of the brake pedal 24.

However, in such a state that the input piston 21 and the brake pedal 24 are pulled in by a forward movement of the primary piston 12 during execution of the automatic brake control as mentioned above, only monitoring a displacement of the brake pedal 24 is not enough to enable a determination whether the displacement of the brake pedal 24 is derived from the forward movement of the primary piston 12 or a driver's operation.

According to the present embodiment, the controller 10 detects a driver's operation of the brake pedal 24 during execution of the automatic brake control in the following manner.

Figure 5:
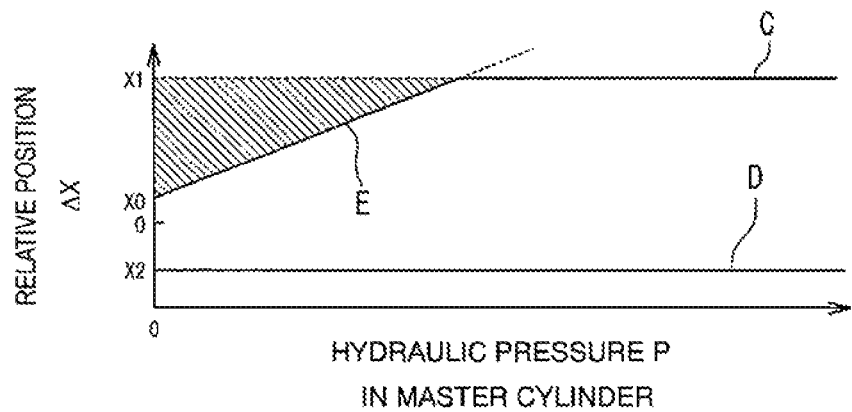
FIG. 5 is a graph illustrating a relative position between the primary piston and the input piston, and a hydraulic pressure in a master cylinder in the electric booster illustrated in FIG. 2.

First, the relative position ΔX between the primary piston 12 and the input piston 21, and the hydraulic pressure P in the master cylinder 2 are in a relationship as illustrated in FIG. 5. Referring to FIG. 5, the upper line segment C extending parallel to the horizontal axis indicates a controllable upper limit value X1 of the relative position ΔX, and the lower line segment D indicates a controllable lower limit value X2 of the relative position ΔX.

Referring to FIG. 2, the mechanically determined maximum value of a displacement of the primary piston 12 relative to the input piston 21 in the advancing direction is the position when a stopper 47 of the primary piston 12 abuts against the spring retainer 21A of the input piston 21, thereby preventing the relative position therebetween from being further moved forward. Therefore, although the mechanical condition allows the relative position ΔX to be moved beyond the X1, it is undesirable to allow a movement of relative position ΔX to the mechanically determined movement limit in terms of, for example, noise generation and durability, and therefore the upper limit value is set to a value smaller than the mechanical limit.

On the other hand, referring to FIG. 2, the mechanically determined maximum value of a displacement of the primary piston 12 relative to the input piston 21 in the retracting direction is the position when the stepped portion 48 of the input piston 21 abuts against the intermediate wall of the primary piston 12, thereby preventing the relative position therebetween from being further moved backward. The lower limit value X2 is a controllable maximum value of a displacement of the primary piston 12 relative to the input piston 21 in the retracting direction. The lower limit value X2 is set to a value smaller than the mechanical maximum value where the stepped portion 48 of the input piston 21 abuts against the intermediate wall of the primary piston 12 to prevent the relative position therebetween from being further moved backward.

Therefore, the above-mentioned upper limit value X1 and lower limit value X2 are controllable upper and lower limits of the relative position between the input piston 21 and the primary piston 12. It should be noted that the range between the upper limit and the lower limit (the range between the controllable upper and lower limit values) of the relative position between the input piston 21 and the primary piston 12, which can be recognized by the controller 10, may vary depending on detection errors, installation errors, and temperature characteristic errors of the rotational position sensor 29 and the stroke sensor 43, while being kept within the above-mentioned mechanical upper and lower limits. Especially, if the brake system 1 continues working in such a state that the zero point of the stroke sensor 43 cannot be adjusted for a long time, a temperature characteristic error, so-called a temperature drift of the stroke sensor 43 may occur, resulting in an excess or drop of the upper or lower limit of the relative position over or below the above-mentioned mechanical upper or lower limit. Therefore, when the vehicle is in such a state that the zero point of the stroke sensor 43 cannot be adjusted for a long time, narrowing the range between the controllable upper and lower limits of the relative position can prevent the controller 10 from driving the electric motor 27 to control the primary piston 12 beyond the mechanical upper and lower limits, thereby improving the reliability of the electric booster.

Further, the inclined line segment E indicates the relationship between the hydraulic pressure P in the master cylinder 2 and the relative position ΔX when zero is set to the reaction force Fr (Fr=0) in the above-described equation (1), i.e., the relationship expressed by the following equation (2):

$$\Delta X = A/K \cdot P + Fs/K \quad (2)$$

When the hydraulic pressure P in the master cylinder 2 is zero (P=0) and the primary piston 12 and the input piston 21 are located at their initial positions (the brake release state), the relative position ΔX is equal to an initial value X0 (=Fs/K).

Referring to FIG. 5, the shaded area above the line segment E (Fr=0), where the reaction force Fr has a negative value (Fr<0), indicates such a state that the input piston 21 and therefore the brake pedal 24 are pulled in due to a forward movement of the primary piston 12. Further, when the relative position ΔX is positioned on the line segment C, i.e., the relative position ΔX reaches the upper limit value X1 (ΔX=X1), the reaction force Fr is equal to or smaller than zero (F<=0). Then the input piston 21 is pulled in by primary piston 12 or is about to be pulled in by a further forward movement of the primary piston 12.

On the other hand, the area below the line segment E (Fr=0) and the line segment C, where the reaction force Fr has a positive value (Fr>0), indicates such a state that a driver's operation force is applied to the input piston 21 and therefore the brake pedal 24.

Further, when the relative position ΔX is located in the area above the line segment C, i.e., the relative position ΔX is larger than the upper limit value X1 (ΔX>X1), the reaction force Fr is smaller than zero (Fr<0), and the input piston 21 is pulled in by the primary piston 12, or is about to be pulled in by a further forward movement of the primary piston 12.

Therefore, in the present embodiment, the value of the relative position ΔX on the line segments E and C in FIG. 5 is set as a brake operation determination threshold value ΔXs in the relationship with the hydraulic pressure P in the master cylinder 2. Then, this brake operation determination threshold value ΔXs is compared with an actual relative position ΔX, which is calculated from the detection values of the stroke sensor 43 and the rotational position sensor 29, in the relationship with an actual hydraulic pressure P detected by the hydraulic sensors 45 and 46. When there is a displacement of the input piston 21 (i.e., the brake pedal 24), the controller 10 can determine whether a driver operates the brake pedal 24 based on this comparison. If the relative position ΔX is smaller than the determination threshold value ΔXs (ΔX<ΔXs), the controller 10 can determine that a driver operates the brake pedal 24. If the relative position ΔX is equal to or larger than the determination threshold value ΔXs (ΔX>=ΔXs), the controller 10 determines that a driver does not operate the brake pedal 24.

The above-described determination threshold value ΔXs is set with an appropriate range added thereto in consideration of a variation in the values due to, for example, dimensional errors of the respective units and detection errors of the sensors. Further, the above-mentioned determination threshold value ΔXs is changed according to the hydraulic pressure P in the master cylinder 2, as indicated by the line segment E in FIG. 5. The rate of this change is set so that the spring forces applied to the input piston 21 by the neutral springs 25 and 26 according to a movement of the primary piston 12 are larger than the force applied to the input piston 21 by the brake hydraulic pressure P generated in the master cylinder 2 according the movement of the primary piston 12 during the automatic brake control. Due to this setting, a release of the brake pedal 24 can infallibly lead to a return of the input piston 21 to the brake release position, and the range of the upper and lower limits, which is a usable range of the relative position between the input piston 21 and the primary piston 12, can be increased as much as possible, thereby enhancing the controllability of the electric booster 3.

Figure 6:
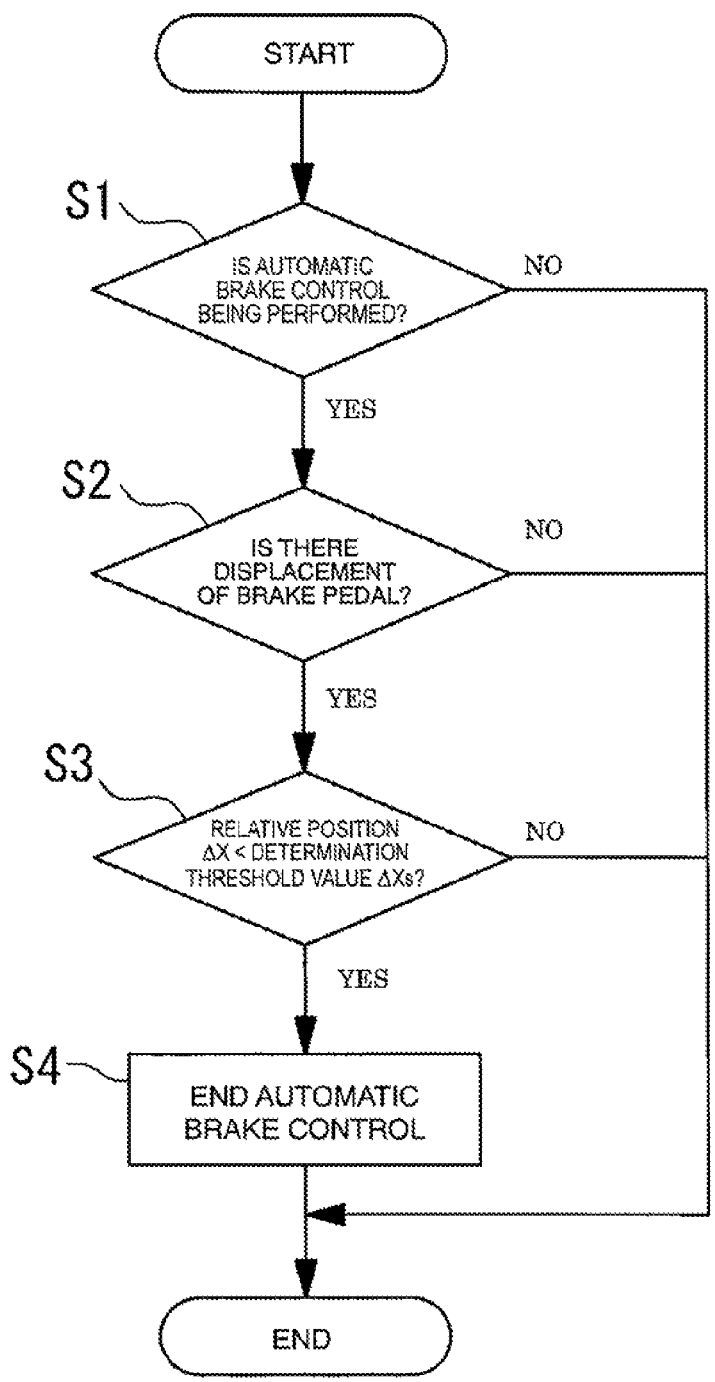
FIG. 6 is a flowchart illustrating control performed when the electric booster illustrated in FIG. 2 detects a driver's operation of a brake pedal during the automatic brake control.

The controller 10 detects a driver's operation of the brake pedal based on the determination threshold value ΔXs during execution of the automatic brake control, according to the control flow illustrated in FIG. 6, which will be now described.

Referring to FIG. 6, in step S1, the controller 10 determines whether the automatic brake control is carried out. If the automatic brake control is carried out, the processing proceeds to step S2. If the automatic brake control is not carried out, the present routine is ended. In step S2, the controller 10 determines whether there is any displacement of the brake pedal 24. If there is a displacement of the brake pedal 24, the processing proceeds to step S3. If there is no displacement of the brake pedal 24, the present routine is ended. The controller 10 can determine existence or absence of a displacement of the brake pedal 24 based on detection of the brake switch 43 and/or the stroke sensor 43. In step S3, the controller 10 compares the relative position ΔX between the primary piston 12 and the input piston 21 with the determination threshold value ΔXs corresponding to the hydraulic pressure P in the master cylinder 2. If the relative position ΔX is smaller than the determination threshold value ΔXs, the processing proceeds to step S4, in which the automatic brake control is ended. If the relative position ΔX is equal to or larger than the determination threshold value ΔXs, the present routine is ended.

In this way, the controller 10 can determine whether a driver operates the brake pedal 24 regardless of whether the brake pedal 24 is pulled in by a forward movement of the primary piston 12 during the automatic brake control. As a result, if the controller 10 detects a driver's operation of the brake pedal 24, the controller 10 ends the automatic brake control, and starts the brake control based on the brake pedal operation, thereby allowing a driver's brake operation to override the automatic brake control.

The above-described embodiment is configured in such a manner that the input piston 21 is inserted in the master cylinder 2, and receives a reaction force derived from the hydraulic pressure in the master cylinder 2. However, the present invention is not limited thereto, and can be also applied to such a brake system that generates a reaction force by connecting a reaction force generator such as a spring applying a predetermined reaction force to the input member coupled to the brake pedal, instead of generating a reaction force by the hydraulic pressure in the master cylinder.

According to the electric booster of the present invention, it is possible to detect a driver's operation of the brake pedal during the automatic brake control.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-244769, filed on Oct. 29, 2010.

The entire disclosure of Japanese Patent Application No. 2010-244769 filed on Oct. 29, 2010 including specification, claims, drawings and summary is incorporated herein by reference in its entirety.

What is claimed is:

1. An electric booster comprising:
an input member adapted to be moved forward or backward in response to an operation of a brake pedal;
an assist member disposed so as to be movable relative to the input member;
a master cylinder adapted to generate a brake hydraulic pressure according to a forward or backward movement of the assist member;
an electric actuator adapted to provide a thrust force to the assist member;
a controller adapted to control an operation of the actuator; and
a biasing unit adapted to bias the input member and the assist member so that a relative position therebetween is moved toward a predetermined neutral position,
wherein the controller can perform automatic brake control of driving the electric actuator regardless of whether there is the operation of the brake pedal,
wherein, during the automatic brake control, the controller compares the relative position between the assist member and the input member with a determination threshold value, and determines that the brake pedal is operated in a case where the relative position is smaller than the determination threshold value and the input member is moved by a predetermined amount or more, and wherein the determination threshold value varies depending on the brake hydraulic pressure generated in the master cylinder.

2. The electric booster according to claim 1, wherein the controller ends the automatic brake control in a case where the controller determines that the brake pedal is operated during the automatic brake control.

3. The electric booster according to claim 1, wherein the input member is disposed so as to face a pressure chamber where the master cylinder generates the brake hydraulic pressure, and
wherein the determination threshold value is set variably depending on the brake hydraulic pressure so that a spring force applied to the input member by the biasing unit according to the movement of the assist member is larger than a force applied to the input member by the brake hydraulic pressure generated in the master cylinder according to the movement of the assist member during the automatic brake control.

4. The electric booster according to claim 1, wherein an upper and lower limit range is set to the relative position between the assist member and the input member,
wherein the input member is provided with a stroke detector configured to detect a movement displacement of the input member, and
wherein the upper and lower limit range of the relative position is set so as to vary over time based on a detection error of the stroke detector due to a temperature change.

5. An automatic brake control method by an electric booster, the electric booster comprising
an input member adapted to be moved forward or backward in response to an operation of a brake pedal,
an assist member disposed so as to be movable relative to the input member,
a master cylinder adapted to generate a brake hydraulic pressure according to a forward or backward movement of the assist member,
an electric actuator adapted to provide a thrust force to the assist member, and
a biasing unit adapted to bias the input member and the assist member so that a relative position therebetween is moved toward a predetermined neutral position, and
wherein the electric booster can perform automatic brake control of driving the electric actuator regardless of whether there is the operation of the brake pedal,
the automatic brake control method comprising:
setting a determination threshold value, wherein the determination threshold valve is changed based on the brake hydraulic pressure generated in the master cylinder;
comparing the determination threshold value with the relative position between the assist member and the input member; and
determining that the brake pedal is operated, in a case where the relative position is smaller than the determination threshold value and the input member is moved by a predetermined amount or more.

6. The automatic brake control method according to claim 5, further comprising ending the automatic brake control, in a case where it is determined that the brake pedal is operated during the automatic brake control.

7. The automatic brake control method according to claim 5, wherein the input member is disposed so as to face a pressure chamber where the master cylinder generates the brake hydraulic pressure, and
wherein the determination threshold value is set variably depending on the brake hydraulic pressure so that a spring force applied to the input member by the biasing unit according to the movement of the assist member is larger than a force applied to the input member by the brake hydraulic pressure generated in the master cylinder according to the movement of the assist member during the automatic brake control.

8. The automatic brake control method according to claim 5, further comprising:
setting an upper and lower limit range of the relative position between the assist member and the input member,
detecting a movement displacement of the input member with use of a stroke detector, and
setting the upper and lower limit range so that the range varies over time based on a detection error of the stroke detector due to a temperature change.

9. An electric booster comprising:
an input member adapted to be moved forward or backward in response to an operation of a brake pedal;
an assist member disposed so as to be movable relative to the input member;
a master cylinder adapted to generate a brake hydraulic pressure according to a forward or backward movement of the assist member;
an electric actuator adapted to provide a thrust force to the assist member;
a controller adapted to control an operation of the actuator;
a biasing unit adapted to bias the input member and the assist member so that a relative position therebetween is moved toward a predetermined neutral position;
a stroke detector adapted to detect a movement displacement of the input member; and
a hydraulic pressure detector adapted to detect the brake hydraulic pressure generated in the master cylinder,
wherein the controller comprises:
an automatic brake controller adapted to drive the electric actuator regardless of whether there is the operation of the brake pedal,
a determination threshold value storage unit adapted to store a determination threshold value, the determination threshold value stored in the determination threshold value storage unit varying depending on the brake hydraulic pressure generated in the master cylinder,
a comparison unit adapted to compare the relative position between the input member and the assist member with the determination threshold value, and
a determination unit adapted to determine that the brake pedal is operated in a case where the relative position is smaller than the determination threshold value and the input member is moved by a predetermined amount or more while the automatic brake controller is carrying out the automatic brake control.

10. The electric booster according to claim 9, wherein the controller comprises an automatic brake control end unit adapted to end the automatic brake control in a case where the determination unit determines that the brake pedal is operated during the automatic brake control.

11. The electric booster according to claim 9, wherein the input member is disposed so as to face a pressure chamber where the master cylinder generates the brake hydraulic pressure, and
wherein the determination threshold value in the determination threshold value storage unit is set variably depending on the brake hydraulic pressure so that a spring force applied to the input member by the biasing unit according to the movement of the assist member is larger than a force applied to the input member by the brake hydraulic pressure generated in the master cylinder according to the movement of the assist member during the automatic brake control.

12. The electric booster according to claim 9, wherein the controller has an upper and lower limit range data of the relative position between the assist member and the input member, and an upper and lower limit range data setting unit adapted to set the upper and lower limit range data of the relative position so that the upper and lower limit range data varies over time based on a detection error of the stroke detector due to a temperature change.

* * * * *